(12) United States Patent
Steinke

(10) Patent No.: US 10,550,845 B2
(45) Date of Patent: Feb. 4, 2020

(54) LIQUID LEVEL SENSING SYSTEM

(71) Applicant: S. J. Electro Systems, Inc., Detroit Lakes, MN (US)

(72) Inventor: Corey Lee Steinke, Detroit Lakes, MN (US)

(73) Assignee: S. J. Electro Systems, Inc., Detroit Lakes, MN (US)

( * ) Notice: Subject to any disclaimer, the term of this patent is extended or adjusted under 35 U.S.C. 154(b) by 251 days.

(21) Appl. No.: 15/216,132

(22) Filed: Jul. 21, 2016

(65) Prior Publication Data

US 2017/0075363 A1  Mar. 16, 2017

Related U.S. Application Data

(60) Provisional application No. 62/195,558, filed on Jul. 22, 2015.

(51) Int. Cl.
| | |
|---|---|
| *F04D 15/02* | (2006.01) |
| *F04B 49/025* | (2006.01) |
| *F04B 23/02* | (2006.01) |
| *F04D 13/08* | (2006.01) |
| *G01F 23/64* | (2006.01) |
| *G01F 23/68* | (2006.01) |
| *G01F 23/36* | (2006.01) |

(52) U.S. Cl.
CPC ........ *F04D 15/0218* (2013.01); *F04B 23/021* (2013.01); *F04B 49/025* (2013.01); *F04D 13/08* (2013.01); *F04D 13/086* (2013.01); *G01F 23/363* (2013.01); *G01F 23/64* (2013.01); *G01F 23/68* (2013.01)

(58) Field of Classification Search
CPC .... F04D 13/08; F04D 13/086; F04D 15/0218; F04B 49/025; F04B 23/021; G01F 23/30; G01F 23/32; G01F 23/36; G01F 23/363; G01F 23/64; G01F 23/68
USPC .......................................................... 417/40
See application file for complete search history.

(56) References Cited

U.S. PATENT DOCUMENTS

| | | | |
|---|---|---|---|
| 3,769,838 A | * | 11/1973 | Buckler ............... G01C 13/004 73/170.31 |
| 4,302,641 A | | 11/1981 | Johnston |
| 4,529,854 A | | 7/1985 | Johnston |
| 4,572,934 A | | 2/1986 | Johnston |
| 4,652,802 A | | 3/1987 | Johnston |
| 5,059,954 A | | 10/1991 | Beldham et al. |
| 5,069,243 A | | 12/1991 | Foreman |
| 5,087,801 A | | 2/1992 | Johnston |
| 5,142,108 A | | 8/1992 | Johnston et al. |
| 5,155,311 A | | 10/1992 | Utke |
| 5,306,885 A | | 4/1994 | Utke |
| 5,909,352 A | | 6/1999 | Klabunde et al. |
| 6,140,925 A | | 10/2000 | Lee et al. |
| 6,420,668 B1 | | 7/2002 | Lee |
| 6,443,005 B1 | | 9/2002 | Chandler |
| 6,595,051 B1 | | 7/2003 | Chandler |
| 7,075,443 B1 | | 7/2006 | Chandler et al. |
| 7,151,459 B1 | | 12/2006 | Chandler et al. |

(Continued)

*Primary Examiner* — Peter J Bertheaud
(74) *Attorney, Agent, or Firm* — Dicke, Billig & Czaja, PLLC

(57) ABSTRACT

A liquid level sensing system is disclosed. The liquid level sensing system includes a float system and an accelerometer. The accelerometer is configured to provide an output signal representative of a position of the float system.

12 Claims, 8 Drawing Sheets

(56) References Cited

U.S. PATENT DOCUMENTS

| | | | |
|---|---|---|---|
| 7,224,283 | B1 | 5/2007 | Chandler et al. |
| 7,471,207 | B1 | 12/2008 | Chandler et al. |
| 7,746,237 | B1 | 6/2010 | Chandler et al. |
| 8,032,256 | B1 | 10/2011 | Wolf et al. |
| 8,226,371 | B2 * | 7/2012 | Kochan ............... F04D 15/0218 |
| | | | 417/40 |
| 8,336,385 | B1 | 12/2012 | Bergum |
| 8,567,242 | B1 | 10/2013 | Bergum |
| 8,650,949 | B1 | 2/2014 | Ostlie et al. |
| 9,034,193 | B2 * | 5/2015 | Shalon .................. G01N 33/18 |
| | | | 210/739 |
| 9,074,587 | B2 | 7/2015 | Atchia |
| 2002/0047783 | A1 | 4/2002 | Bergum et al. |
| 2006/0272203 | A1 | 12/2006 | Weber |
| 2008/0288115 | A1 | 11/2008 | Rusnak et al. |
| 2012/0100014 | A1 | 4/2012 | Seitter |
| 2013/0022475 | A1 | 1/2013 | Atchia |
| 2015/0332882 | A1 | 11/2015 | Bergum |
| 2017/0250041 | A1 | 8/2017 | Bergum |

\* cited by examiner

LIQUID LEVEL SENSING SYSTEM

CROSS-REFERENCE TO RELATED APPLICATIONS

This Utility patent application claims priority to U.S. Provisional Application Ser. No. 62/195,558 filed on Jul. 22, 2015 which is incorporated herein by reference.

BACKGROUND

Liquid level sensing devices are typically devices that measure the hydrostatic pressure of a liquid, the distance from the sensor to the liquid, the change in capacitance of the device due to the presence of the liquid on the sensor, or the change in resistance of the sensor due to the presence of the liquid. Other sensing methods have been used with varying degrees of success.

Liquid level sensor uses range from clean (e.g., potable) water environments to dirty (e.g., wastewater) water environments. Many known sensing methods have problems with reliability of sensing due to the type of sensor and the sensor environment. Such problems include damage to the sensing elements, and a buildup of contaminants that skew sensor readings. In certain applications, there may be objects present in the vicinity of the sensor that interfere with the sending of sensor readings, or result in a difficulty in getting sensor readings set properly. Additionally, liquid level sensing devices may not be cost effective when scaled down to a much lower liquid level sensing range.

For these and other reasons, there is a need for the present invention.

SUMMARY

One example of a liquid level sensing system includes a float system and an accelerometer. The accelerometer is configured to provide an output signal representative of a position of the float system. The liquid level sensing system may be used in multiple liquid level sensing applications, including potable and non-potable water pumping systems.

DETAILED DESCRIPTION

In the following Detailed Description, reference is made to the accompanying drawings, which form a part hereof, and in which is shown by way of illustration specific examples in which the disclosure may be practiced. In this regard, directional terminology, such as "top," "bottom," "front," "back," "leading," "trailing," etc., is used with reference to the orientation of the Figure(s) being described. Because components of examples can be positioned in a number of different orientations, the directional terminology is used for purposes of illustration and is in no way limiting. It is to be understood that other examples may be utilized and structural or logical changes may be made without departing from the scope of the present disclosure. The following detailed description, therefore, is not to be taken in a limiting sense, and the scope of the present disclosure is defined by the appended claims.

It is to be understood that the features of the various examples described herein may be combined with each other, unless specifically noted otherwise.

As used herein, the term "coupled" or "electrically coupled" is not meant to mean that the elements must be directly coupled together and intervening elements may be provided between the "coupled" or "electrically coupled" elements.

The liquid level sensing system disclosed includes a float system and an accelerometer. The accelerometer is configured to provide an output signal representative of a position of the float system. In one or more examples, the accelerometer provides an output signal representative of the angle of the float system for determining a liquid level. The use of an accelerometer in a liquid level sensing system as disclosed results in a system capable of continuous liquid level monitoring and a very reliable liquid level sensing system that may be used in multiple liquid level sensing applications, including potable and non-potable water pumping systems.

Figure 1:
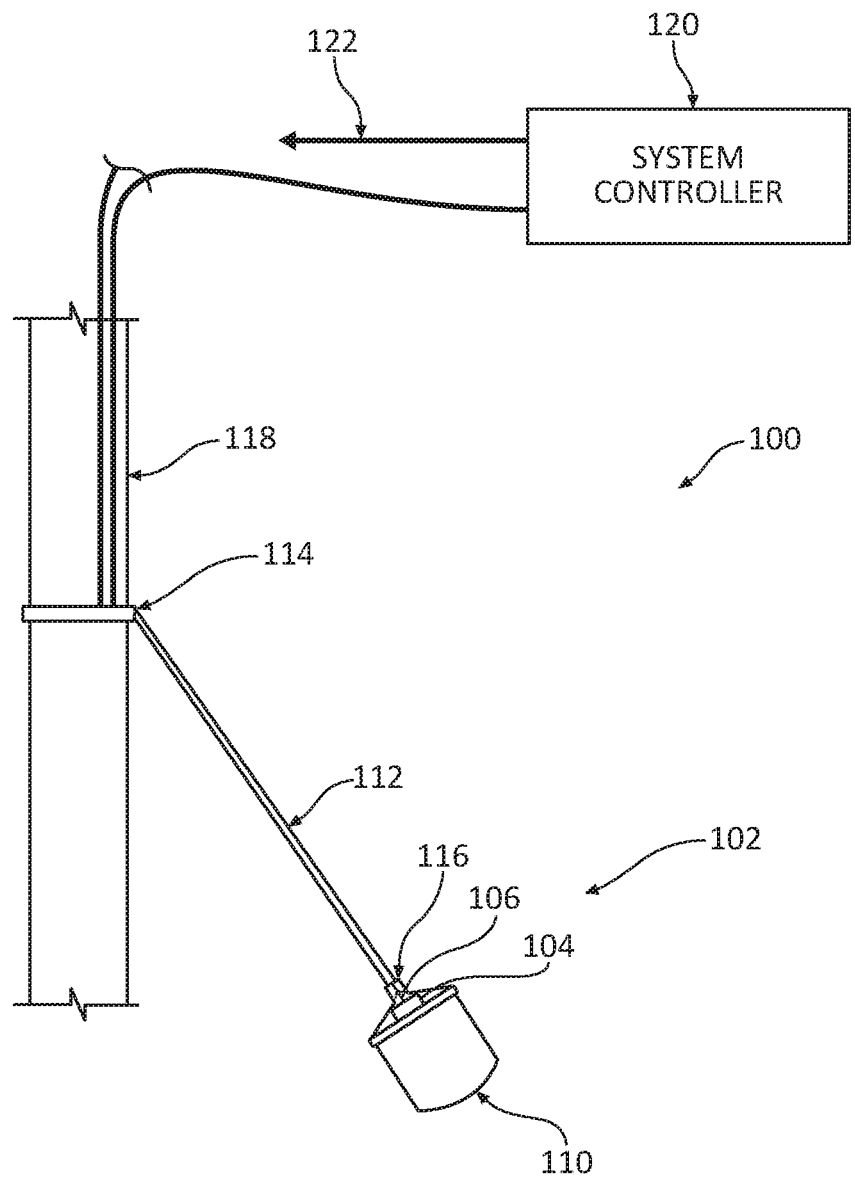
FIG. 1 illustrates one example of a liquid level sensing system including an accelerometer.

FIG. 1 illustrates one example of a liquid level sensing system at 100. The liquid level sensing system 100 includes a float system 102 and an accelerometer 104. The accelerometer 104 provides an output signal 106 representative of a position of the float system 102. The float system 102 includes a float member 110 and a tether 112. The accelerometer 104 is coupled to the float member 110. By using an accelerometer, the liquid level is continuously monitored by the liquid level sensing system.

The float member includes a housing 114 which in one example is made of a molded polymeric material. The accelerometer 104 is fixedly secured inside of the float member housing 114. In one example, the accelerometer 104 is located on a circuit board that is fixedly secured inside of the float member housing. Accelerometer 104 is coupled to a controller as part of a float control system. While accelerometer 104 is located inside float member 110 in this example, in other examples the accelerometer may be positioned at other locations along float system 102.

Tether 112 can be a rigid or flexible member. The tether 112 includes a first end 114 and a second end 116. The first end 114 is a fixed end. In one example it is fixedly secured to a fixed member 118, such as a discharge pipe. The second end 116 is a floating end, and is coupled to the float member 110. The tether 112 may be very short in length, or relatively long, depending on the liquid levels being monitored. Further, the tether 112 may also be used as a wiring conduit for control or power wires from the float member 110 to a control system such as system controller 120. The tether 112 continues beyond the fixed end 114, and acts to protect the wiring between the accelerometer 104 and a system controller. In one example, the tether 112 is sized to include both power wiring to the accelerometer 104, and control wires between the accelerometer 104 and the system controller 120. The system controller 120 responds to signals received from accelerometer 104, including output signal 106, to control external mechanisms such as activating and deactivating a pumping system, indicated at 122.

Figure 2:
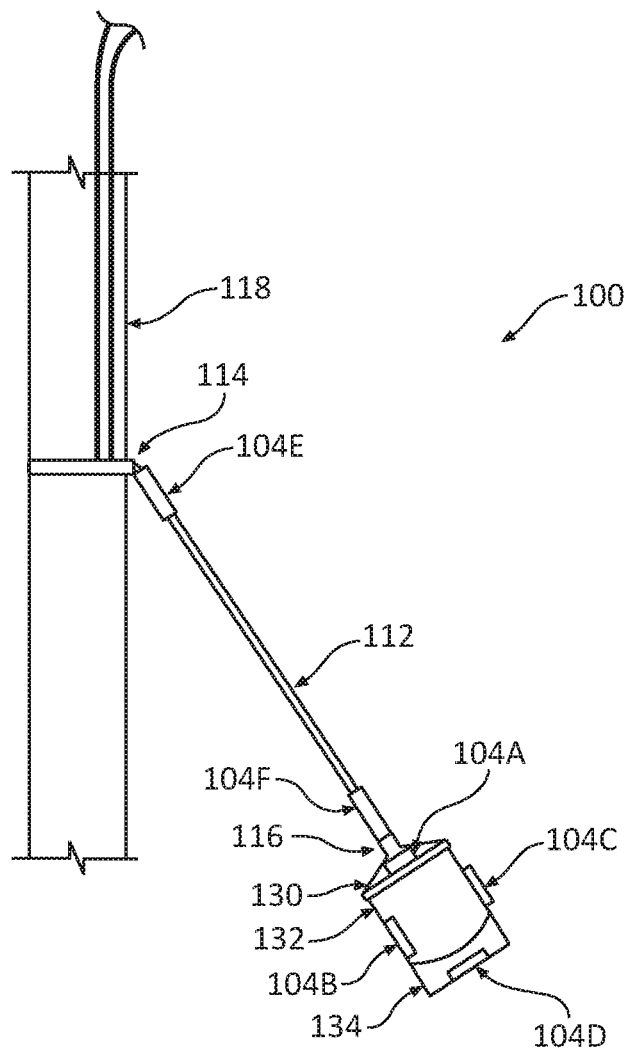
FIG. 2 illustrates another example of a liquid level sensing system including an accelerometer located at various locations within the system.

FIG. 2 illustrates examples of various locations of accelerometer 104 within liquid level sensing system 100. Float member 110 includes a cap 130, a float body 132, and an end portion 134. In one example, the accelerometer is fixedly secured in the cap 132, indicated at accelerometer 104A. Alternatively, the accelerometer may be located inside the area of the float body 132 (indicated as accelerometer 104B), or outside the area of the float body 132 (indicated as accelerometer 104C). The accelerometer may also be located at end portion 134, indicated as accelerometer 104D.

The accelerometer may also be located at other positions within the float system 102. The accelerometer may be located at fixed end 114 of tether 112, indicated as accelerometer 104E. The accelerometer may be located at flexible end 116 of tether 112, indicated as accelerometer 104F. Alternatively, the accelerometer may be located at any position along tether 112 between fixed end 114 and flexible end 116. In one or more examples, accelerometer 104 is positioned on a printed circuit board, an may be coupled to a microcontroller or other circuit elements as part of a float control system.

Figure 3:
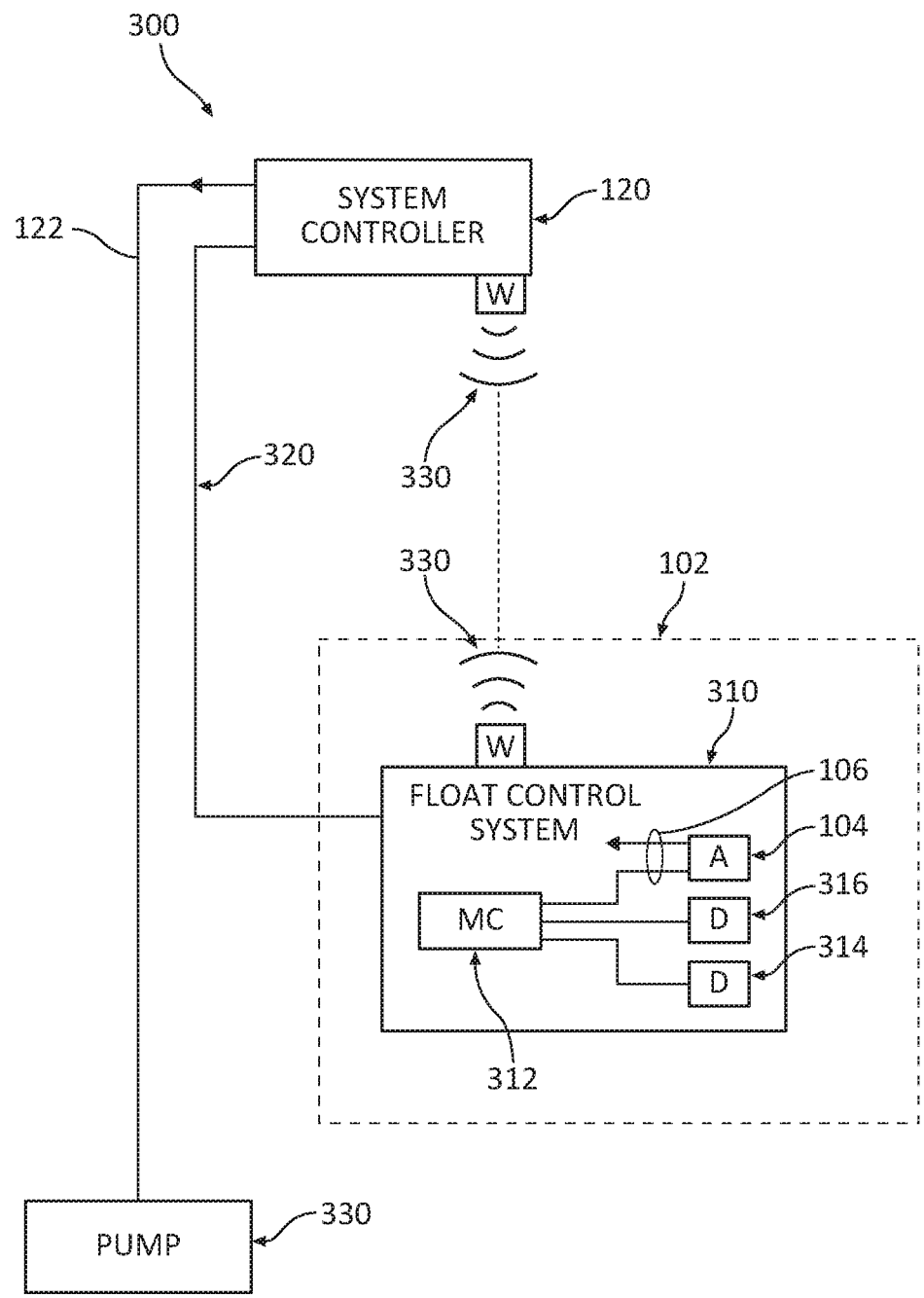
FIG. 3 illustrates one example of a control diagram for a liquid level sensing system including an accelerometer.

FIG. 3 illustrates at 300 one example of a control diagram for liquid level sensing system 100. The control diagram includes system controller 120 and float control system 310 located at the float system 102. Float control system 310 includes accelerometer 104. Float control system 310 may also include other control and sensing devices. In one example, float control system 310 includes a microcontroller 312 coupled to accelerometer 104, and other devices 314, 316. The microcontroller 312 and accelerometer 104 may be located on a common circuit board.

Float system 310 operates to continuously monitor liquid levels. Float control system 310, including accelerometer 104, is coupled to system controller 120 (indicated at 320). In operation, accelerometer 104 provides an output signal representative of the angle of the float member. In one example, the angle is relative to the direction of gravity. The accelerometer 104 provides the output signal (e.g., output signal 106), either directly or via microcontroller 312, from the float control system 310 to system controller 120. Based on the output signal 106, system controller 120 can activate or deactivate an external device 330, such as a pump. In one example, based on the level of the output signal 106, the system controller 120 provides power to or shuts off power to a pump located near the float system 102.

A number of different methods can be used for manipulating data received from the accelerometer 104 to provide an electrical signal to a monitoring or control device to take action based on a derived liquid level. In one example, a raw integer output signal from the accelerometer 104 is scaled to drive a digital to analog converter which provides a 4 to 20 milliamp control signal to system controller 120. In another example, a raw integer output signal from the accelerometer 104 is scaled to a pulse frequency signal of limited bandwidth, which is provided to system controller 120. In another example, a raw integer output signal from the accelerometer 104 is scaled and sent via a communication protocol to system controller 120.

Float control system 310 communicates with system controller 120 via a wired communication link indicated at 320. Communication link 320 can include power wiring from system controller 120 to float control system 310 devices, and also monitoring and control wiring between the float control system 310 devices and system controller 120. In one example, the power, monitoring and control wires are routed between control system 310 devices and system controller 120 via the float system 102 tether 112. The tether 112 acts as a conduit to protect the wires from the external environment. In other examples, float system 120 communicates monitoring and control signals to system controller 120 via a wireless communication system 330.

Figure 4:
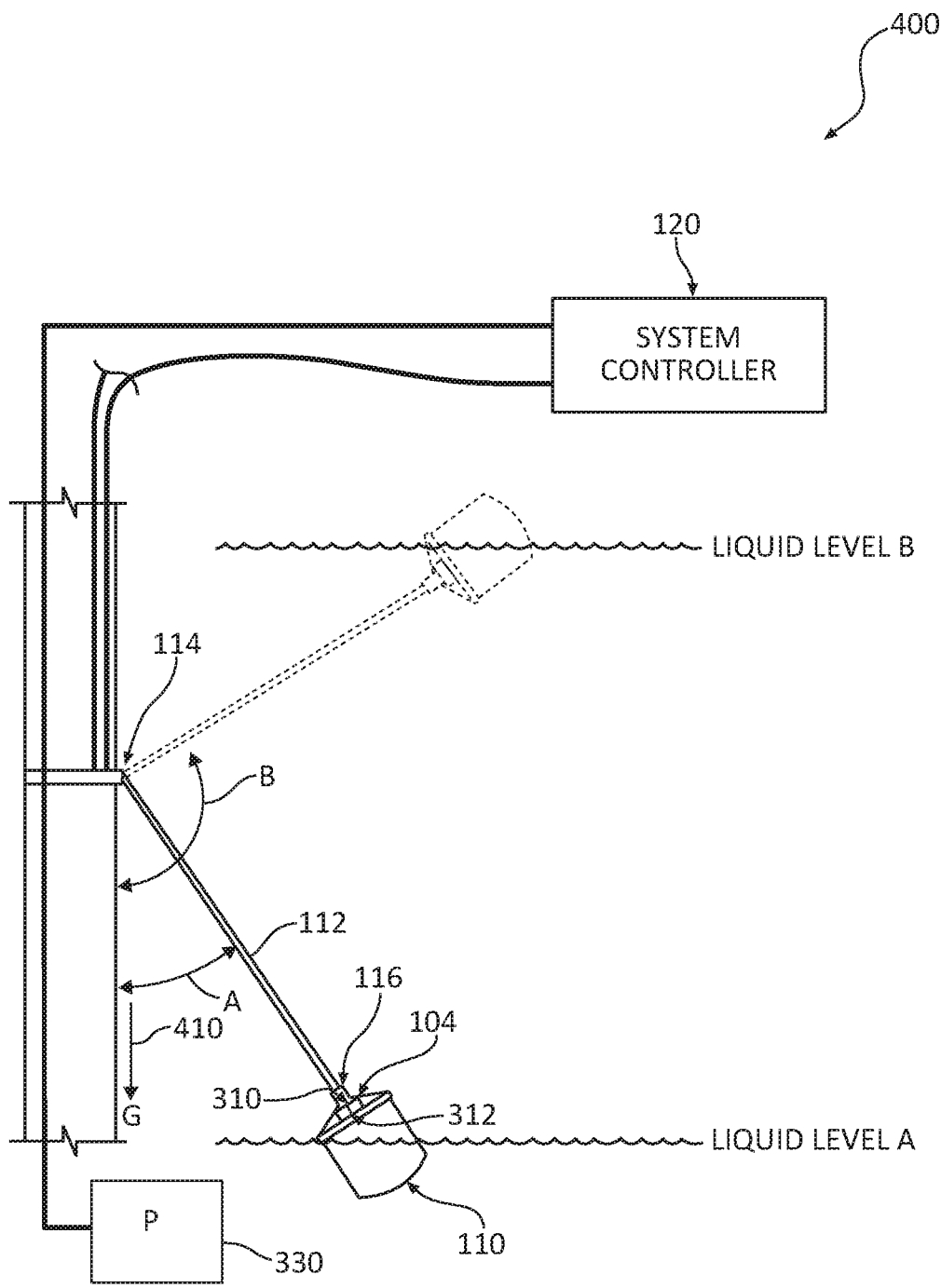
FIG. 4 illustrates one example of a liquid level sensing system in operation.

FIG. 4 is a diagram illustrating one example of a liquid level sensing system in operation, indicated as liquid level system 400. The liquid level system 400 is similar to those previously described herein. The liquid level sensing system 400 includes float system 102, including float member 110 and tether 112. A float control system 310 is located on float system 102, and in one example, inside float member 110. In this example, the float control system 310 includes accelerometer 104 in communication with microcontroller 312. The float control system 310 is capable of providing continuous communication signals to a control system located remote from float system 102, such as system controller 120. In one example, the power and communication wiring between float control system 310 and system controller 120 is routed from float member 110 to the system controller 120 inside of tether 112 (using tether 112 as a protective conduit).

In one example of operation, the accelerometer 104 is a three axis accelerometer. It is also recognized that accelerometer 104 maybe a single axis or two axis accelerometer. The accelerometer 104 communicates the angle of rotation, in X, Y, and Z coordinates relative to the direction of the force of gravity 410, of the float system 102 to microcontroller 312. The microcontroller 312 receives the accelerometer data output signal, and provides an appropriate output signal to system controller 120 to take action based on the derived liquid level. In one example, the level of the liquid is derived by taking into consideration the angle of the float system and the length of the tether 112 between fixed end point 114 and the location of the accelerometer 104 at second end 116. As an example, when the level of liquid rises from liquid level A to liquid level B, the derived float sensor angle from accelerometer 104 increases from angle A to angle B (e.g., from 35 degrees at liquid level A to 145 degrees at liquid level B). Upon receipt of a control signal associated with angle B of liquid level B, the system controller is set to activate pump 330 until the level of liquid returns to a desired level such as liquid level A. Once the control signal is reached that is representative of liquid level A, the system controller 120 operates to shut off pump 330.

Figure 5:
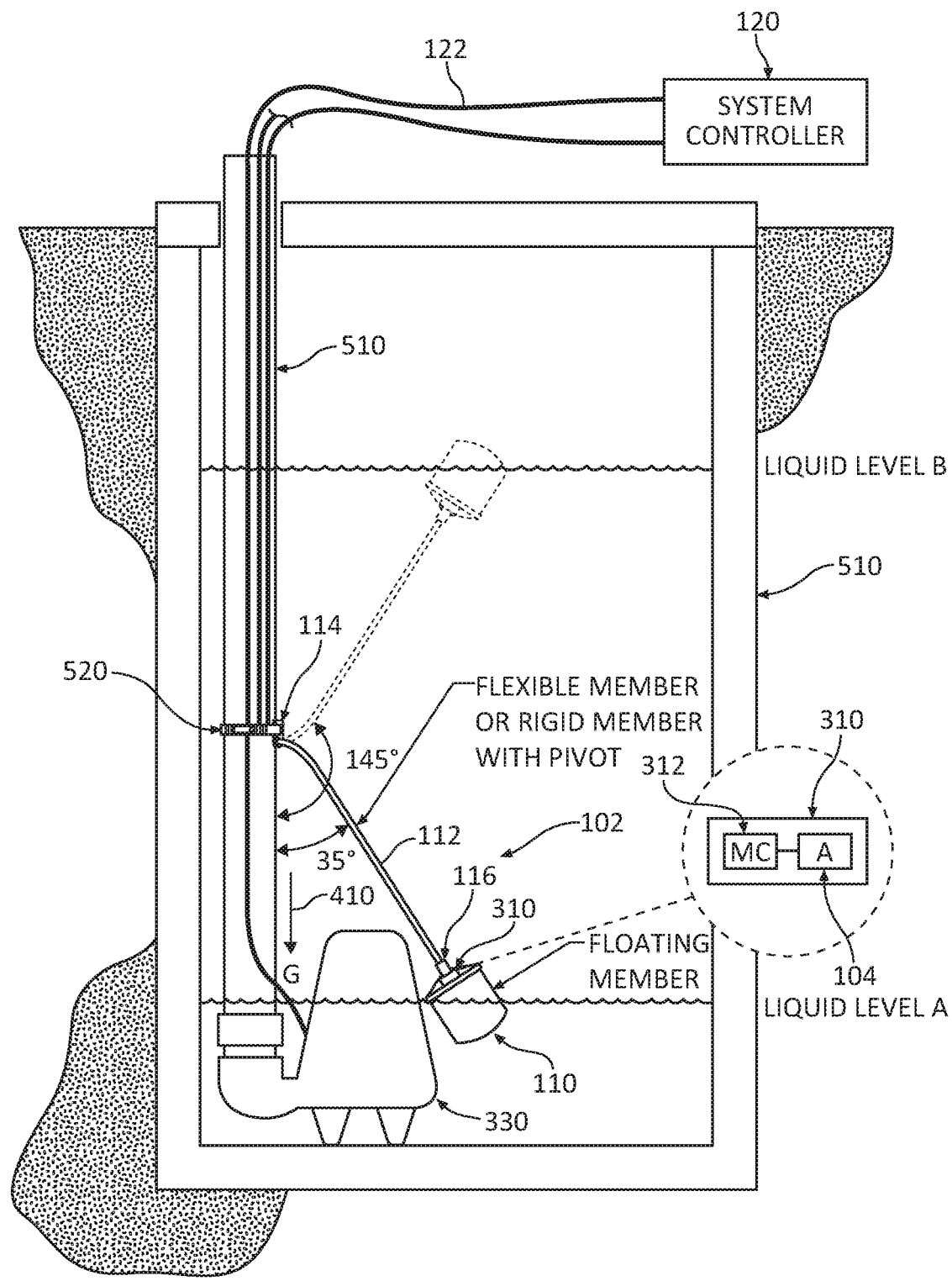
FIG. 5 illustrates one example of an application of a liquid level sensing system including an accelerometer used in a liquid pumping system.

FIG. 5 illustrates one example of a liquid level sensing system used in a liquid pumping operation. The liquid level sensing system 500 is similar to the liquid level sensing systems previously described herein. The liquid in this example is a potable or non-potable water (e.g., rainwater, wastewater, waste slurry, etc.). The liquid level sensing system 100 is positioned within a tank, reservoir or enclosure 510. In operation, when the liquid level sensing system 100 senses that the liquid has reached a set level, the control system activates a pump to discharge the liquid from the tank 510 until the liquid level returns to a desired level. The liquid is pumped from the tank via discharge pipe 510.

Figure 6:
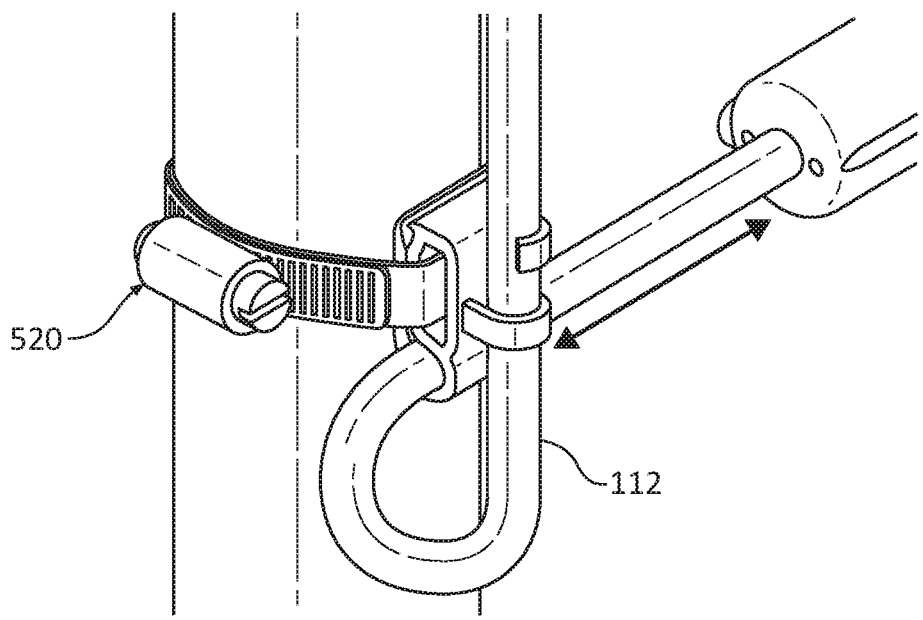
FIG. 6 illustrates is a partial view illustrating one example of connecting a tether to a discharge pipe in liquid level sensing system.

The liquid level sensing system 500 includes float system 102, including a float member 110 and a tether 112. A float control system 310 is located on float system 102, and in one example, inside float member 110. In this example, the float control system 310 includes accelerometer 104 in communication with microcontroller 312. The float control system 310 provides communication signals to a control system located remote from float system 102, such as system controller 120. In one example, the power and communication wiring between float control system 310 and system controller 120 is routed from float member 110 to the system controller 120 inside of tether 112 (using tether 112 as a protective conduit). As illustrated in partial detail in FIG. 6, tether 112 is secured to discharge pipe 510 using a bracket 520. This results in tether fixed end 114.

Figure 7:
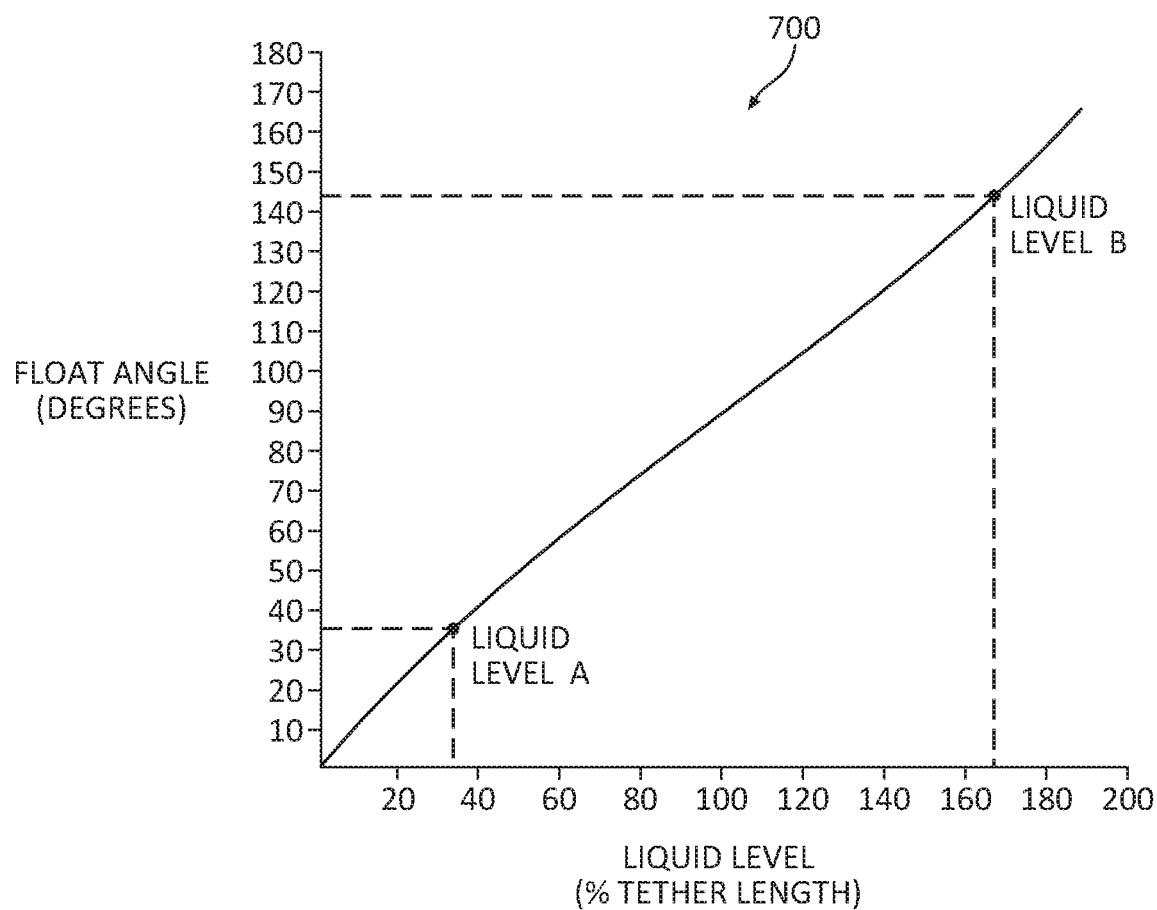
FIG. 7 is a graph illustrating one example of using a liquid level sensing system to determine a liquid level.
Figure 7:
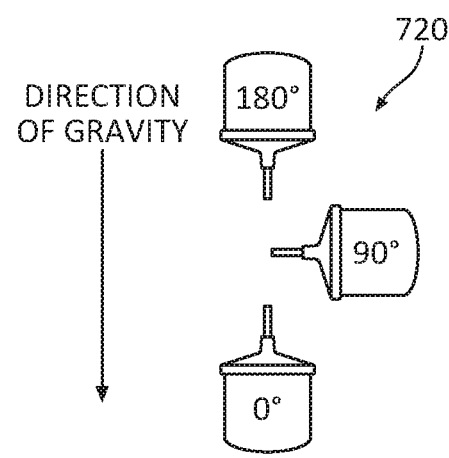
Figure 8:
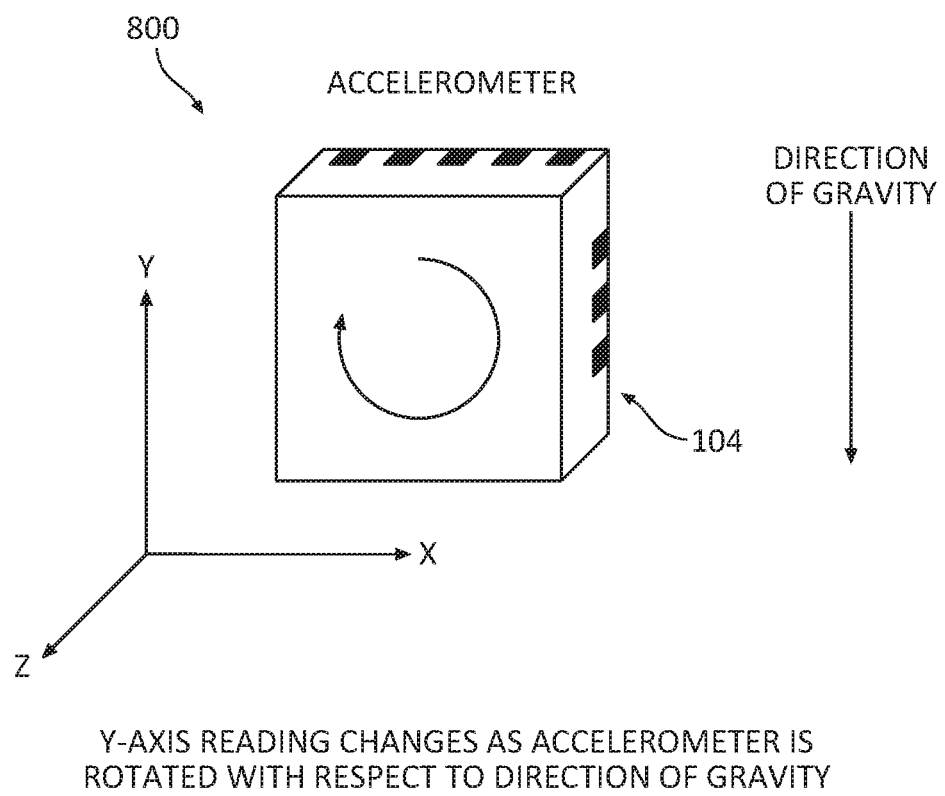
FIG. 8 is one example of a multi-axis accelerometer used in a liquid level sensing system.

In one example of operation, the accelerometer 104 is a three axis accelerometer. The accelerometer 104 communicates the angle of rotation, in X, Y, and Z coordinates relative to the direction of the force of gravity 410, of the float system 102 to microcontroller 312. The microcontroller 312 receives the accelerometer data output signal, and provides an appropriate output signal to system controller 120 to take action based on the derived liquid level. In one example further illustrated in the graph of FIG. 7, the level of the liquid is derived by taking into consideration the angle of the float system (relative to the direction of gravity) and the length of the tether 112 between fixed end point 114 and the location of the accelerometer at second end 116. The graph 700 is a graph of the float system 102 angle relative to the direction of gravity (received as an output from accelerometer 104) versus the liquid level in the tank (as a percentage of the tether length). A key showing the float member angle relative to the direction of gravity based on various float member positions is illustrated at 720. FIG. 8 is a further example of a multi-axis accelerometer used in a liquid level sensing system.

As an example, when the level of liquid rises from a first liquid level, liquid level A to a second liquid level, liquid level B, the derived float sensor angle from accelerometer 104 increases from angle A to angle B (e.g., from 35 degrees at liquid level A to 145 degrees at liquid level B). Upon receipt of a control signal associated with angle B of liquid level B, the system controller activates pump 330 to discharge the liquid from the tank 510 until the level of liquid returns to a desired level such as liquid level A. Once the system controller receives a control signal that is representative of liquid level A, the system controller 120 operates to shut off pump 330. During this operation, as illustrated in the graph 700 of FIG. 7, the liquid level increases from liquid level A of 36% of the tether length to liquid level B of 164% of the tether length. Once the pump 330 is activated, the pump operates to discharge liquid from the tank until the liquid level returns to the level of liquid level A (36% of tether length).

The liquid level sensing system according to the present disclosure provides a unique and simple way for gaining a continuous liquid level measurement. The liquid level sensing system can be easily installed by clamping a flexible or rigid member with a pivot (e.g., a tether) to the discharge pipe or other stationary member of the liquid level tank. The liquid level sensing system is then allowed to rotate freely as the liquid level in the tank rises or falls.

Although specific examples have been illustrated and described herein, a variety of alternate and/or equivalent implementations may be substituted for the specific examples shown and described without departing from the scope of the present disclosure.

In alternative embodiments, various types of control signals may be used for communicating the sensed accelerometer angle to the system controller. For example, the signals may be a 4-20 mA signal, a variable voltage output, a variable frequency pulse output, a communication protocol or discrete digital signals may be used to communicate continuous liquid level information. Further, other relay and/or solid state switches may be used in combination with the accelerometer based sensing system which could operate the system in other manners, such as directly switching a pump motor on or off to control a liquid level. Further, wireless communication may be used to provide continuous level information to the controlling or monitoring device.

This application is intended to cover any adaptations or variations of the specific examples discussed herein. Therefore, it is intended that this disclosure be limited only by the claims and the equivalents thereof.

The invention claimed is:

1. A liquid level sensing system comprising:
a float system including a float member having a float cap including a first end and a second end, and a float body coupled to the second end of the float cap;
a tether having a first tether end and a second tether end, the first tether end coupled to the float member, at the first end of the float cap, and the second tether end fixedly secured to a fixed member;
an accelerometer configured to provide an output signal representative of a position of the float system, where the accelerometer is positioned within the float cap and where the accelerometer is a three axis accelerometer that provides the output signal representative of an angle of the float system relative to the direction of gravity; and
a float control system that determines a liquid level using the output signal and a tether length.

2. A liquid level sensing system comprising:
a float system including a float member having a float cap and a float body,
an accelerometer configured to provide an output signal representative of a position of the float system, where the accelerometer is positioned within the float cap and where the accelerometer is a three axis accelerometer;
a tether coupled to the float member; and
further comprising wires, the wires including at least one of power, monitoring and control wires that are routed from the float member through the tether, where the tether is a conduit that protects the wires from an external environment.

3. A float system used in sensing a liquid level comprising:
a float member including a float cap and a float body;
an accelerometer positioned within the float member, fixedly secured in the float cap; and
a float control system positioned within the float member, including a controller and the accelerometer, that provides an output signal representative of a position of the float member using an output signal from the accelerometer representative of an angle of the float member relative to the direction of gravity, and a tether length.

4. The float system of claim 3, where the float member further includes an end portion, where the float body is positioned between the float cap and the end portion.

5. The float system of claim 3, the float member comprising the accelerometer positioned on a printed circuit board within the float cap.

6. The float system of claim 3, comprising a tether having the tether length, where the float member includes a first end and a second end, and the first end is attached to the tether, and where the float cap is located at the first end.

7. The float system of claim 3, where the accelerometer is a two axis accelerometer.

8. The float system of claim 3, where the accelerometer is a three axis accelerometer.

9. A liquid level sensing system comprising:
- a float system including a float member having a first end and a float body, and a tether attached to the float member;
- a float control system coupled to the float system, including an accelerometer, that provides an output signal representative of a position of the float system, where the accelerometer is a three axis accelerometer;
- a discharge system, where the tether is coupled to the discharge system; and
- wires routed between the float control system and a system controller via the tether, where the tether is a conduit for the wires,
- where the system controller receives the output signal and operates a pump based on the output signal.

10. The liquid level sensing system of claim 9, where the accelerometer is positioned in the float member, within the first end.

11. The liquid level sensing system of claim 9, comprising:
- a pump coupled to the discharge system, where the float control system provides a first liquid level output signal based on a first float position and a second liquid level output signal based on a second position, and where system controller activates the pump when the output signal reaches the second liquid level output signal.

12. The liquid level sensing system of claim 11, where the system controller continues to activate the pump until the output signal returns to the first liquid level output signal.

* * * * *